(12) United States Patent
Wang et al.

(10) Patent No.: US 8,711,551 B2
(45) Date of Patent: Apr. 29, 2014

(54) ELECTRONIC DEVICE WITH MULTI-ORIENTATION

(75) Inventors: Chia-Min Wang, New Taipei (TW); Zhi-Gang Yang, Shenzhen (CN); Hui Yuan, Shenzhen (CN); Ping Yu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 136 days.

(21) Appl. No.: 13/158,462

(22) Filed: Jun. 13, 2011

(65) Prior Publication Data

US 2012/0170181 A1 Jul. 5, 2012

(30) Foreign Application Priority Data

Dec. 29, 2010 (CN) .......................... 2010 1 0612214

(51) Int. Cl.
*H05K 7/00* (2006.01)

(52) U.S. Cl.
USPC ............. 361/679.01; 361/679.21; 361/679.22

(58) Field of Classification Search
USPC ........ 361/679.21, 679.22; 248/495, 496, 420, 248/157, 419, 297.31
See application file for complete search history.

(56) References Cited

U.S. PATENT DOCUMENTS

| | | | |
|---|---|---|---|
| 6,266,241 B1* | 7/2001 | Van Brocklin et al. | .. 361/679.46 |
| 7,301,759 B2* | 11/2007 | Hsiung | ..................... 361/679.27 |
| 2003/0029986 A1* | 2/2003 | Zuller | ............................. 248/476 |
| 2008/0083682 A1* | 4/2008 | Moss et al. | ...................... 211/72 |
| 2011/0164357 A1* | 7/2011 | Yeom et al. | .............. 361/679.01 |

FOREIGN PATENT DOCUMENTS

| | | |
|---|---|---|
| TW | M330688 | 4/2008 |
| TW | M389417 | 9/2010 |

* cited by examiner

*Primary Examiner* — Tuan T Dinh
*Assistant Examiner* — Mukund G Patel
(74) *Attorney, Agent, or Firm* — Novak Druce Connolly Bove + Quigg LLP

(57) ABSTRACT

An electronic device includes a back shell, a support, a slide button and an elastic member. The back shell defines a first sliding slot and at least three second slots communicating with and intersecting with the first sliding slot. The support includes a connection portion connected to the back shell. The connection portion defines a through hole and includes a stop portion. The slide button is slidably connected to the back shell and includes a positioning portion. The positioning portion passes through the through hole and is operable to be selectively received in one of the second slots to enable the support to maintain different positions. The elastic member includes two ends respectively abutting against the positioning portion and the stop portion. The elastic member is configured to apply a push force to hold the positioning portion in position.

6 Claims, 11 Drawing Sheets

ELECTRONIC DEVICE WITH MULTI-ORIENTATION

BACKGROUND

1. Technical Field

The present disclosure relates to electronic devices with a support, especially to an electronic device with a multi-orientation support.

2. Description of Related Art

Portable electronic devices such as digital photo frames usually include a support to support the digital photo frame on a table. The support can often support the digital photo frame in only one or two orientations. It would be appreciated and useful if a support can provide more orientations for the portable electronic devices.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
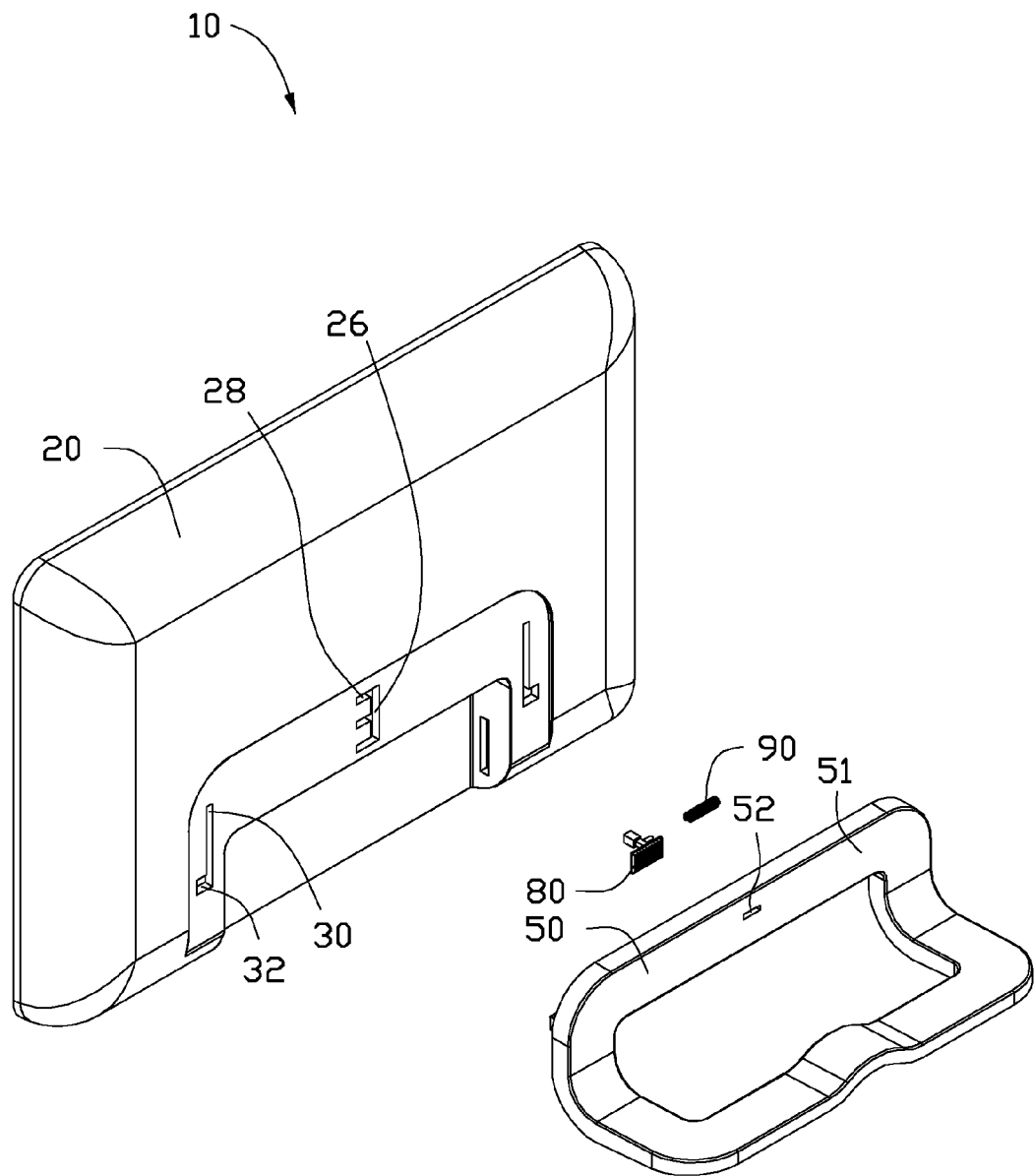
FIG. 1 is an exploded view of an electronic device according to an exemplary embodiment.
Figure 2:
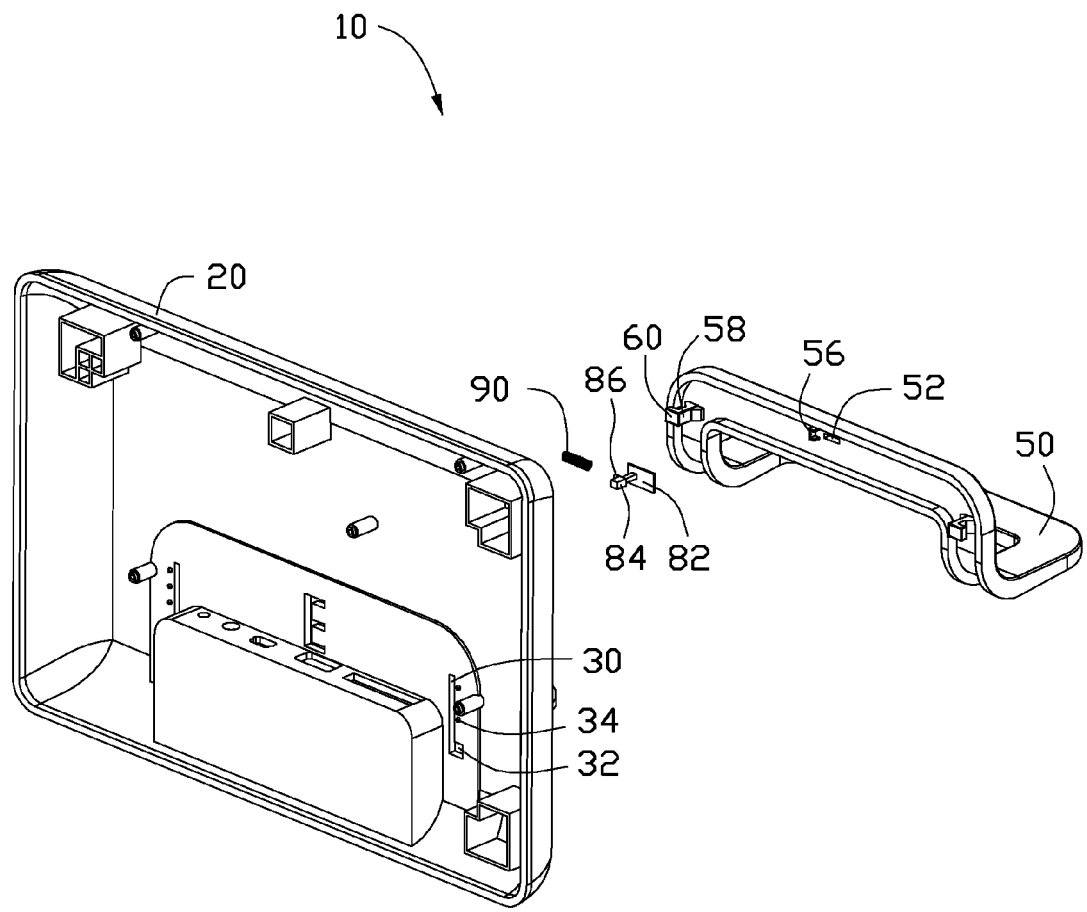
FIG. 2 is similar to FIG. 1, but viewed from a different viewpoint.

Referring to FIGS. 1 and 2, an electronic device 10 according to an exemplary embodiment includes a back shell 20, a support 50, a slide button 80 and an elastic member 90.

The support 50 includes a connection portion 51 that is connected to the back shell 20. The connection portion 51 defines a through hole 52. The connection portion 51 includes a stop portion 56 at its inner side opposite to the back shell 20. The stop portion 56 is substantially perpendicular to the through hole 52 in a transverse direction. The connection portion 51 further includes two guiding protrusions 58 protruding from its inner side. A free end of each guiding portion 58 includes a hook 60.

Figure 3:
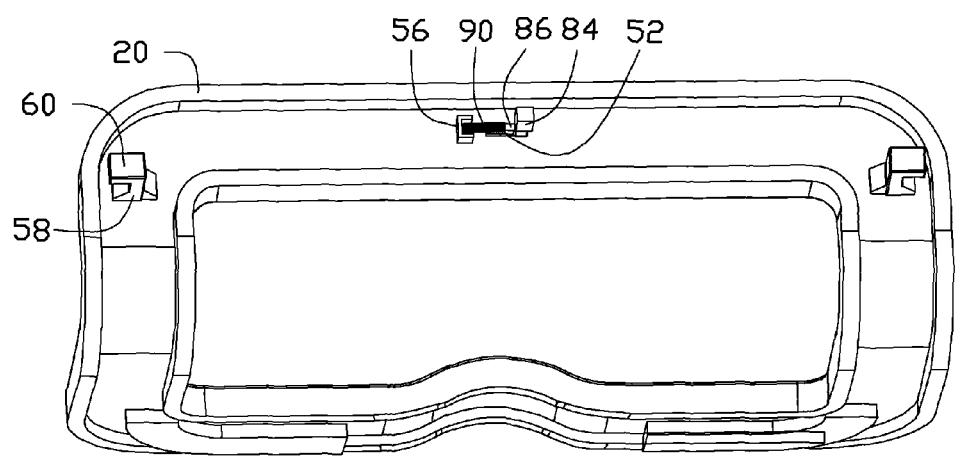
FIG. 3 is an isometric view of a support of the electronic device in FIG. 1, viewed from the rear side.

The slide button 80 includes a button body 82 and a positioning portion 84 protruding from the button body 82. A restriction portion 86 protrudes from the positioning portion 84. Referring to FIG. 3, the positioning portion 84 passes through and can slide along the through hole 52. The elastic member 90 is sleeved on the restriction portion 86. One end of the elastic member 90 abuts against the positioning portion 84, and the other end of the elastic member 90 abuts against the stop portion 56. The elastic member 90 pushes the positioning portion 84 to be received in an end of the through hole 52 away from the stop portion 56. Because of the elastic member 90, the slide button 80 can be retained in the position shown in FIG. 3. In an exemplary embodiment, the elastic member 90 is a coil spring.

The back shell 20 defines a longitudinal sliding slot 26 and three horizontal slots 28 communicating with the sliding slot 26. The three horizontal slots 28 are seated at a same side of the sliding slot 26. The three horizontal slots 28 are all perpendicular to the sliding slot 26. The back shell 20 further defines two guiding grooves 30 parallel to the sliding slot 26, and two installing holes 32 respectively communicating with the two guiding grooves 30. The installing holes 32 allow for the penetration of the hooks 60. After the hook 60 passes through the installing hole 32, the guiding portion 58 is slidable along the guiding groove 30.

The back shell 20 further includes two sets of protrusions 34 adjacent to the guiding grooves 30 on the inner side thereof. Each set of protrusions 34 are arranged in a line parallel to the lengthwise direction of the guiding groove 30. Each hook 60 defines an indentation (not shown).

Figure 4:
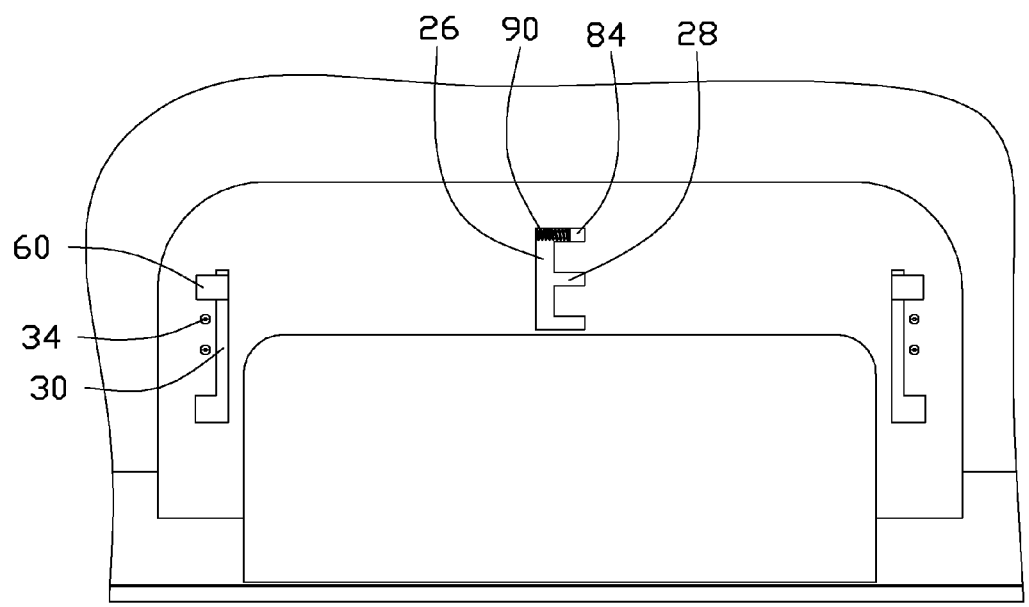
FIG. 4 is a partial, schematic view of a back shell of the electronic device in FIG. 1, illustrating a positioning portion thereof positioned at an upper horizontal slot in FIG. 2.
Figure 5:
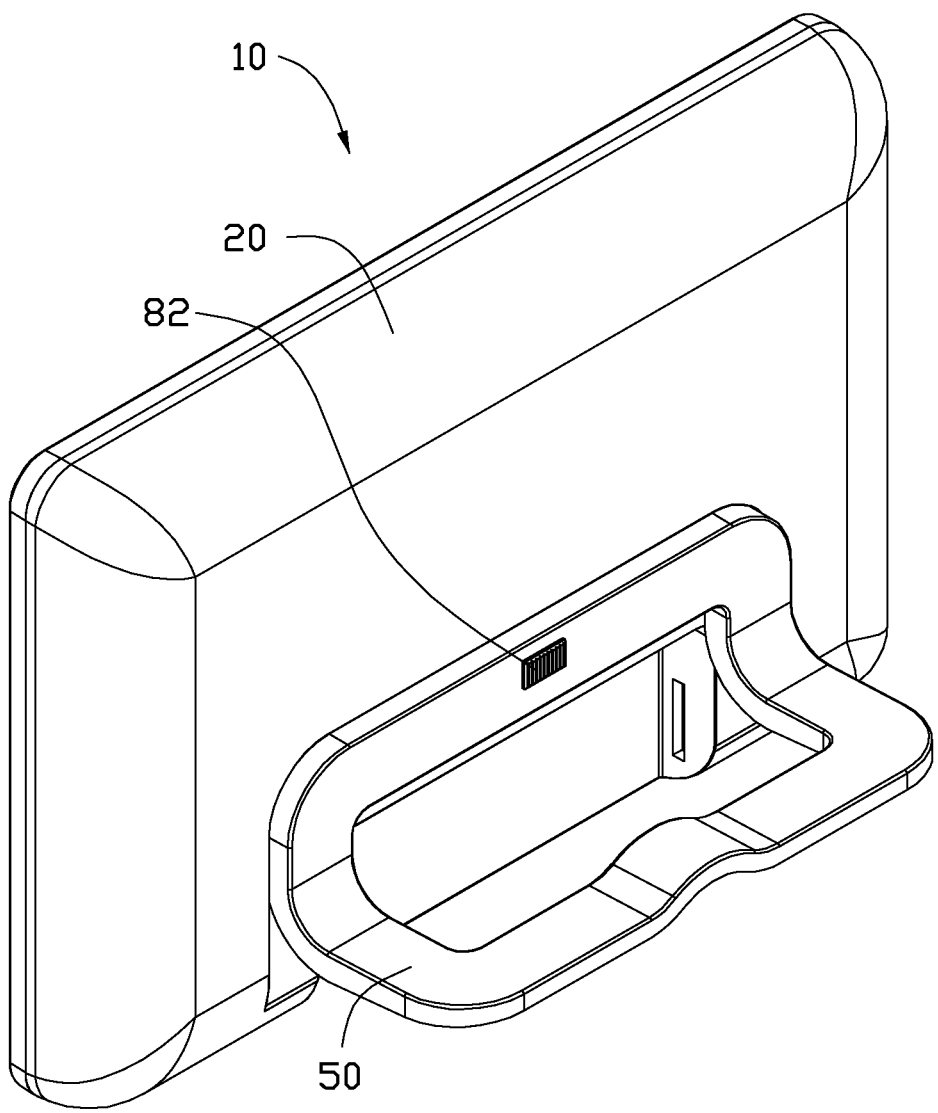
FIG. 5 is an isometric view of the electronic device in FIG. 1, in a position conforming with FIG. 4.

Referring to FIGS. 3 to 5, the support 50 stays in a first position and supports the body of the electronic device 10 in a first orientation. In this embodiment, the positioning portion 84 passes through the through hole 52 and is located in the upper horizontal slot 28. The guiding portion 58 is located at the top end of the guiding groove 30. Each upper protrusion 34 is received in the indentation of the hook 60.

Figure 6:
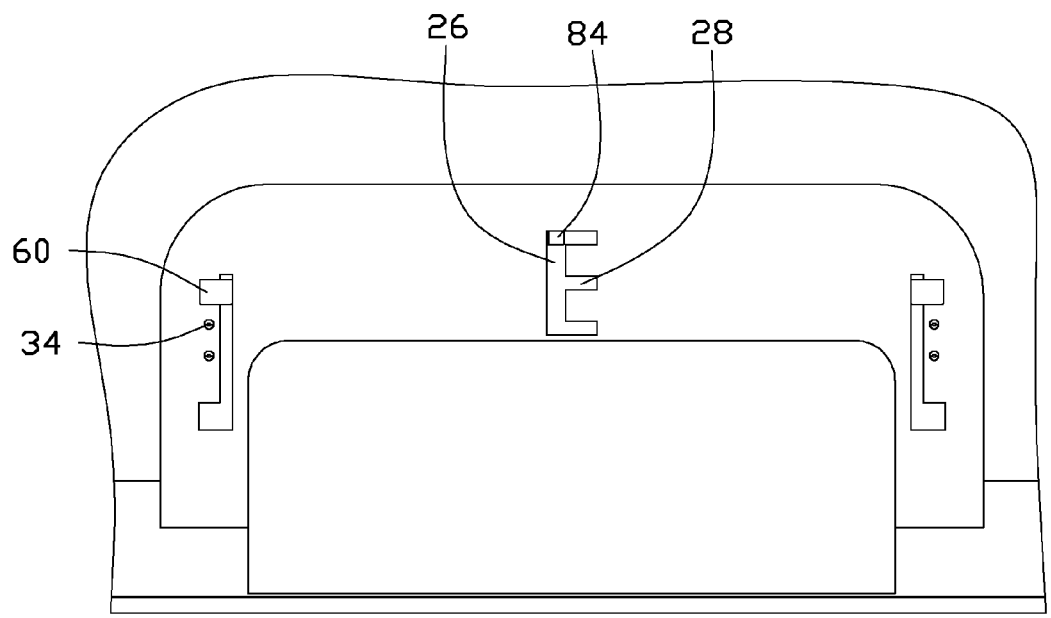
FIG. 6 is similar to FIG. 4, but with the positioning portion slid to a sliding slot.
Figure 7:
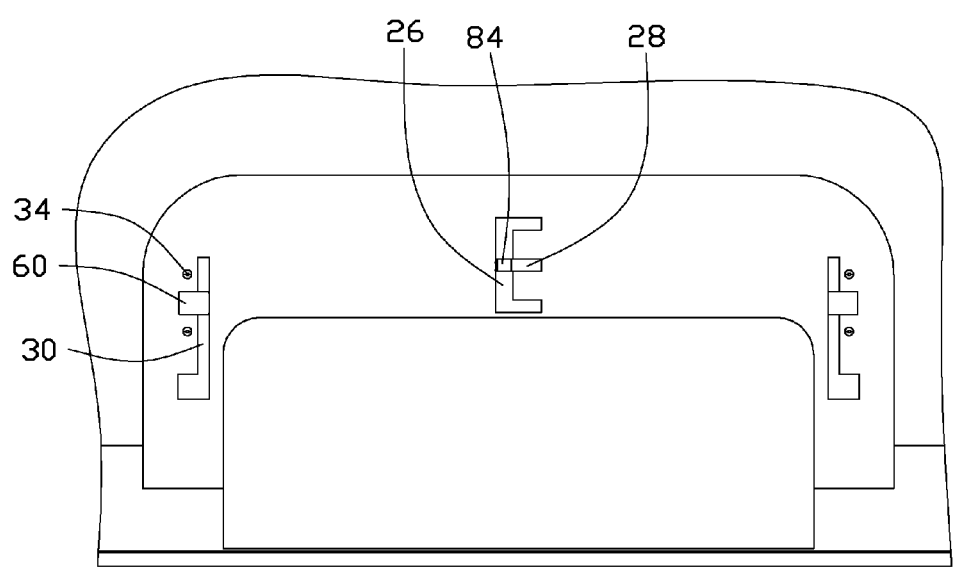
FIG. 7 is similar to FIG. 4, but with the positioning portion slid to a middle horizontal slot.

Referring to FIGS. 3, 5 and 6, when needed, the button body 82 can be pushed toward the stop portion 56 along the through hole 52, until the positioning portion 84 moves to the sliding slot 26. During the sliding of the button 80, the elastic member 90 is compressed. Referring to FIG. 7, the button body 82 is then pushed to slide along the sliding slot 26 until there is a feedback indicating that the middle protrusions 34 have been received in the indentations of the hooks 60. At this time, the positioning portion 84 is aligned with the middle horizontal slot 28.

Figure 8:
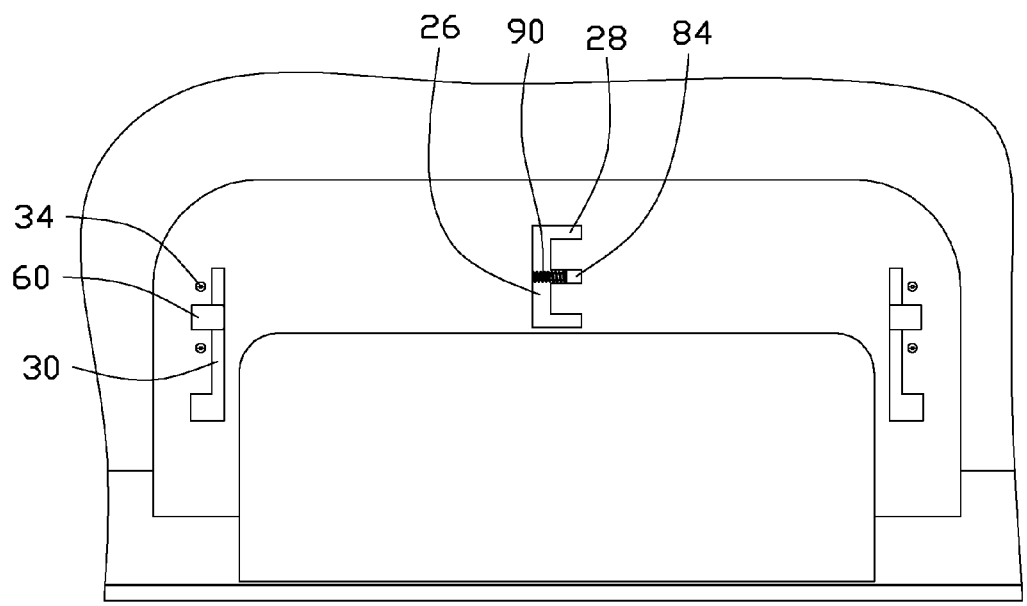
FIG. 8 is similar to FIG. 4, but with the positioning portion located in a middle horizontal slot.
Figure 9:
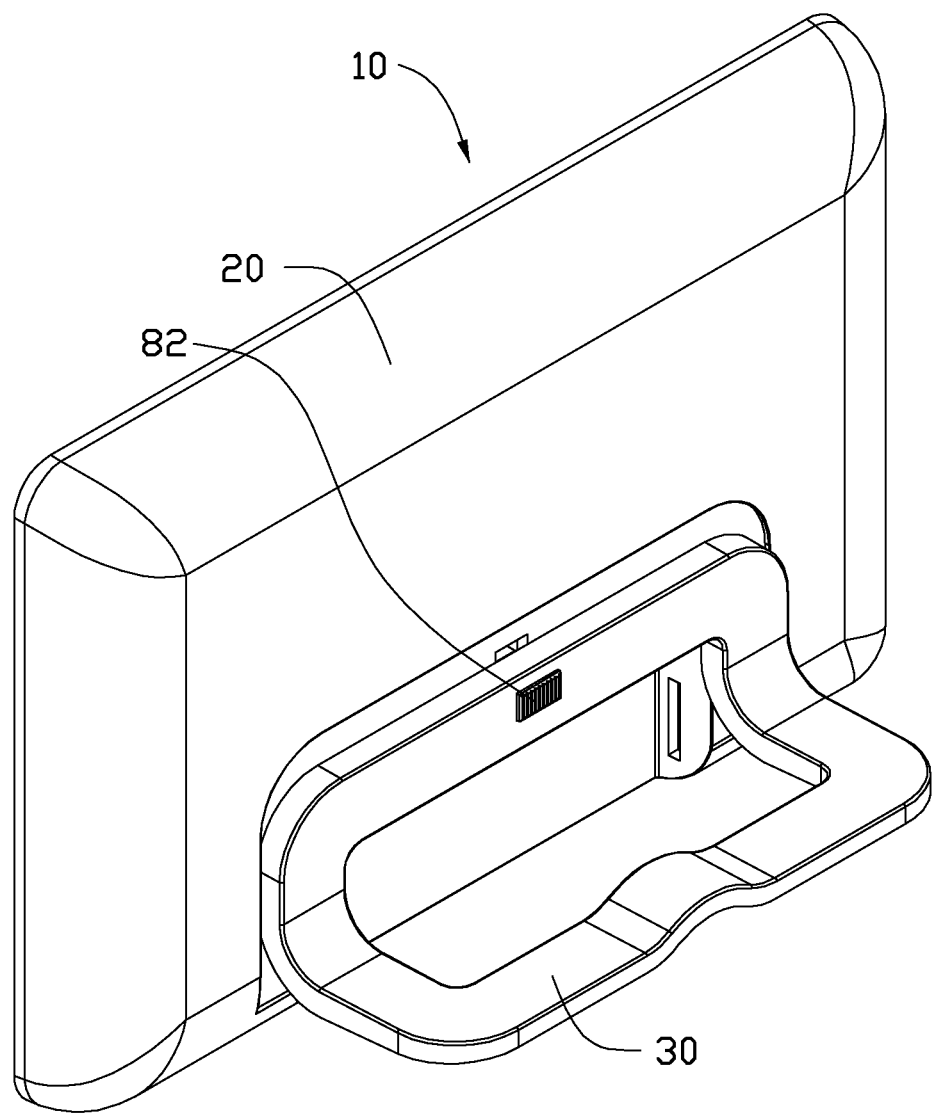
FIG. 9 is an isometric view of the electronic device in FIG. 1, in a position conforming with FIG. 8.

Referring to FIG. 8, once feeling resistance, a user stops pushing the button body 82, enabling the positioning portion 84 to be urged into the middle horizontal slot 28 under the action of the elastic member 90. Referring to FIG. 9, as a result, the support 50 is retained at a second position and supports the body of the electronic device 10 in a second orientation.

Figure 10:
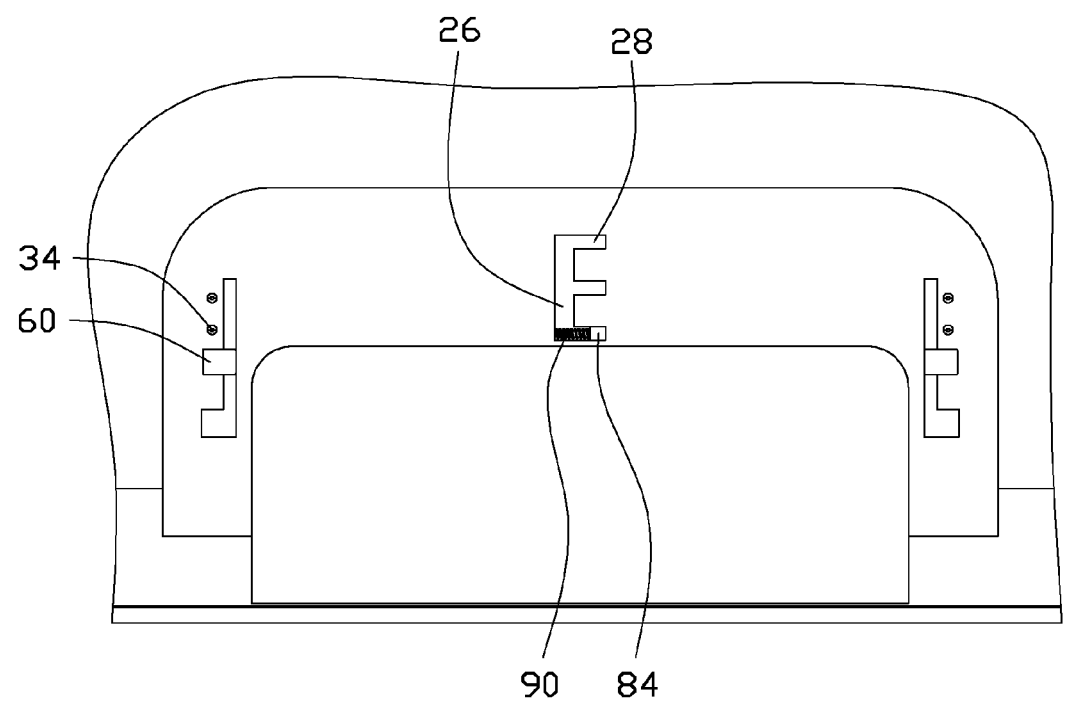
FIG. 10 is similar to FIG. 4, but with the positioning portion located at a lower horizontal slot.
Figure 11:
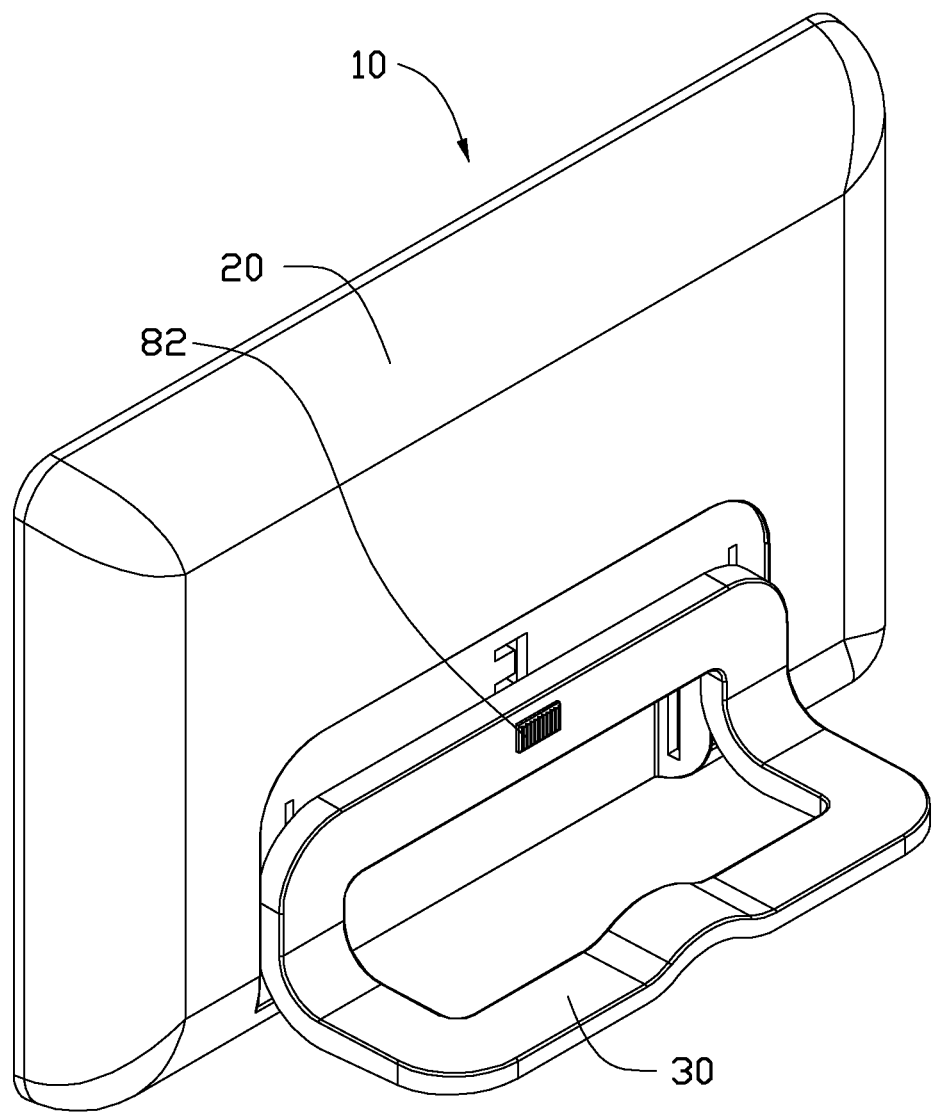
FIG. 11 is an isometric view of the electronic device in FIG. 1, in a position conforming with FIG. 10.

Referring to FIGS. 10 and 11, when needed, the positioning portion 84 can be moved into the lower horizontal slot 28, the support 50 can then support the body of the electronic device 10 in a third orientation.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An electronic device comprising:
a back shell defining a first sliding slot, and at least three second slots extending substantially perpendicularly to an extending direction of the first sliding slot, the at least three second slots communicating with and intersecting with the first sliding slot;
a support being tilted relative to the back shell and comprising a connection portion connected to the back shell, the connection portion defining a through hole and comprising a stop portion;
a slide button slidably connected to the back shell and comprising a positioning portion, the positioning portion passing through the through hole and operable to be selectively received in one of the second slots, enabling the support to stay in different positions thereby enabling the support to support the back shell in different orientations; and
an elastic member comprising two ends respectively abutting against the positioning portion and the stop portion and configured to apply an elastic force to hold the positioning portion in position.

2. The electronic device of claim 1, wherein the connection portion further comprises at least one guiding protrusion protruding from its inner side, the back shell further defines at least one guiding groove parallel to the sliding slot, the at least one guiding portion is slidable along the at least one guiding groove.

3. The electronic device of claim 1, wherein a restriction portion protrudes from the positioning portion, the elastic member is sleeved on the restriction portion.

4. The electronic device of claim 2, wherein the back shell further defines at least one installing hole communicating with the at least one guiding groove, the guiding portion comprises a hook, the at least one installing hole is configured for allowing the hook to pass through.

5. The electronic device of claim 4, wherein the back shell comprises at least one set of protrusions adjacent to the guiding groove on the inner side of the back shell, each of the at least one set of protrusions is arranged in a line parallel to the lengthwise direction of the at least guiding groove, the hook defines an indentation, when the positioning portion is received in one of the second slots, a protrusion of the set of protrusions is received in the indentation.

6. The electronic device of claim 1, wherein the number of the at least three second slots is three.

\* \* \* \* \*